(No Model.)
J. FRYE.
SLEIGH RUNNER FOR CHILDREN'S CARRIAGES.
No. 552,112. Patented Dec. 31, 1895.
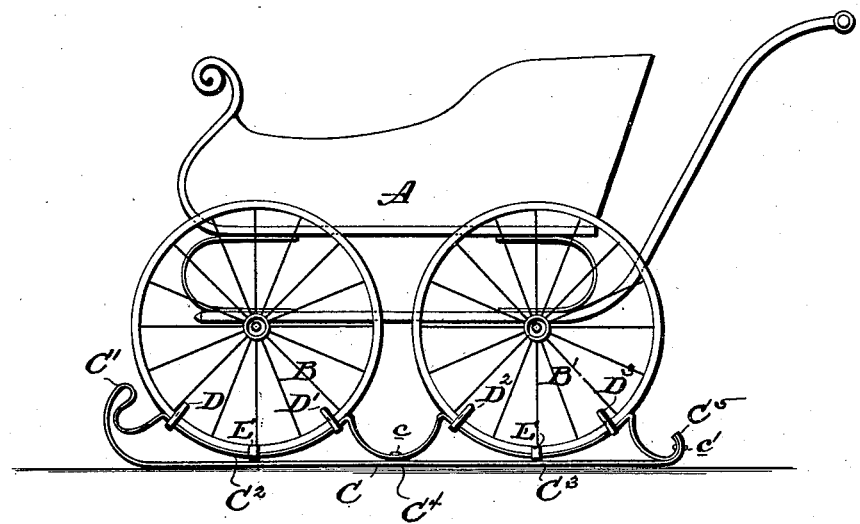
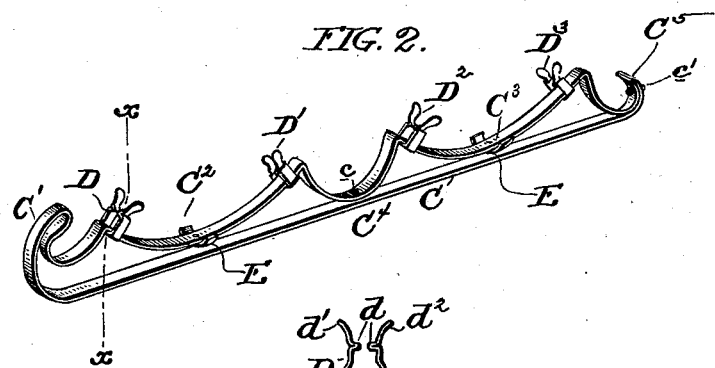
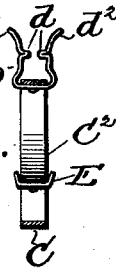
WITNESSES:
INVENTOR

UNITED STATES PATENT OFFICE.

JAMES FRYE, OF PHILADELPHIA, PENNSYLVANIA.

SLEIGH-RUNNER FOR CHILDREN'S CARRIAGES.

SPECIFICATION forming part of Letters Patent No. 552,112, dated December 31, 1895.

Application filed April 25, 1895. Serial No. 547,094. (No model.)

*To all whom it may concern:*

Be it known that I, JAMES FRYE, a citizen of the United States, residing at Philadelphia, in the county of Philadelphia and State of Pennsylvania, have invented certain new and useful Improvements in Sleigh-Runners for Baby-Carriages; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain new and useful improvements in sleigh-runners for temporary use on baby-carriages and other wheeled vehicles.

The invention consists in the peculiar construction of the parts whereby the runners can be readily secured to and detached from the vehicle without the use of bolts, screws and other like appliances, as more fully described hereinafter, and pointed out in the claim hereunto annexed.

In reference to the accompanying drawings, Figure 1 illustrates a side elevation of a baby-carriage having my improved device thereto attached. Fig. 2 is a detached perspective view of my improved invention, and Fig. 3 is a section on the line $x\ x$ of Fig. 2.

A designates the baby-carriage having wheels B and B'.

C represents a thin strip of steel curved upwardly at a point C', and having segmental curved portions $C^2$ and $C^3$, said curved portions conforming with the peripheries of said wheels. At a point $C^4$ the upper portion of the metal strip is depressed and secured to the lower portion thereof by a rivet $c$, the two ends of the bar coming together and terminating in a turned-up portion $C^5$, having rivet $c'$ for securing the two terminals of the metal strip.

D, D', $D^2$, and $D^3$ are spring-clips for the purpose of securing the runner C to the wheels of the baby-carriage. They are composed of strips of spring-steel riveted to the upper portion of the runner and having inwardly-projecting portions $d$ which engage the inner surface of the wheel. The portions $d'$ and $d^2$, which flare outwardly for the purpose of guiding the rim of the wheel into a position to be locked by the portions $d$, also act as levers to disengage the runner from the wheels of said carriage. At the lowest point in the curved portion $C^2$ are placed guides E, which serve to steady the runners and keep them in a fixed position on the peripheries of the wheels. It will then be seen that the said runners may be readily secured to and detached from the wheels of the baby-carriage without necessitating the use of bolts or screws of any kind.

The device is simple in its construction and manipulation and can be made at a very low cost.

Having now fully described my invention, what I claim, and desire to secure by Letters Patent, is—

The combination in sleigh runners for baby carriages of the continuous spring steel strip curved at the top to fit a portion of the periphery of the wheels and having spring clips D, D', $D^2$ and $D^3$, secured to said curved portion and adapted to surround the rims of the wheels, projecting fingers for disengaging said clips, guiding strips, E, in the center of said curved portion to centrally guide the runners and keep them in contact with said wheels, substantially as described and for the purpose set forth.

In testimony whereof I affix my signature in presence of two witnesses.

JAMES FRYE.

Witnesses:
ROBERT W. LLOYD,
HERBERT I. LLOYD.